Patented Nov. 4, 1952

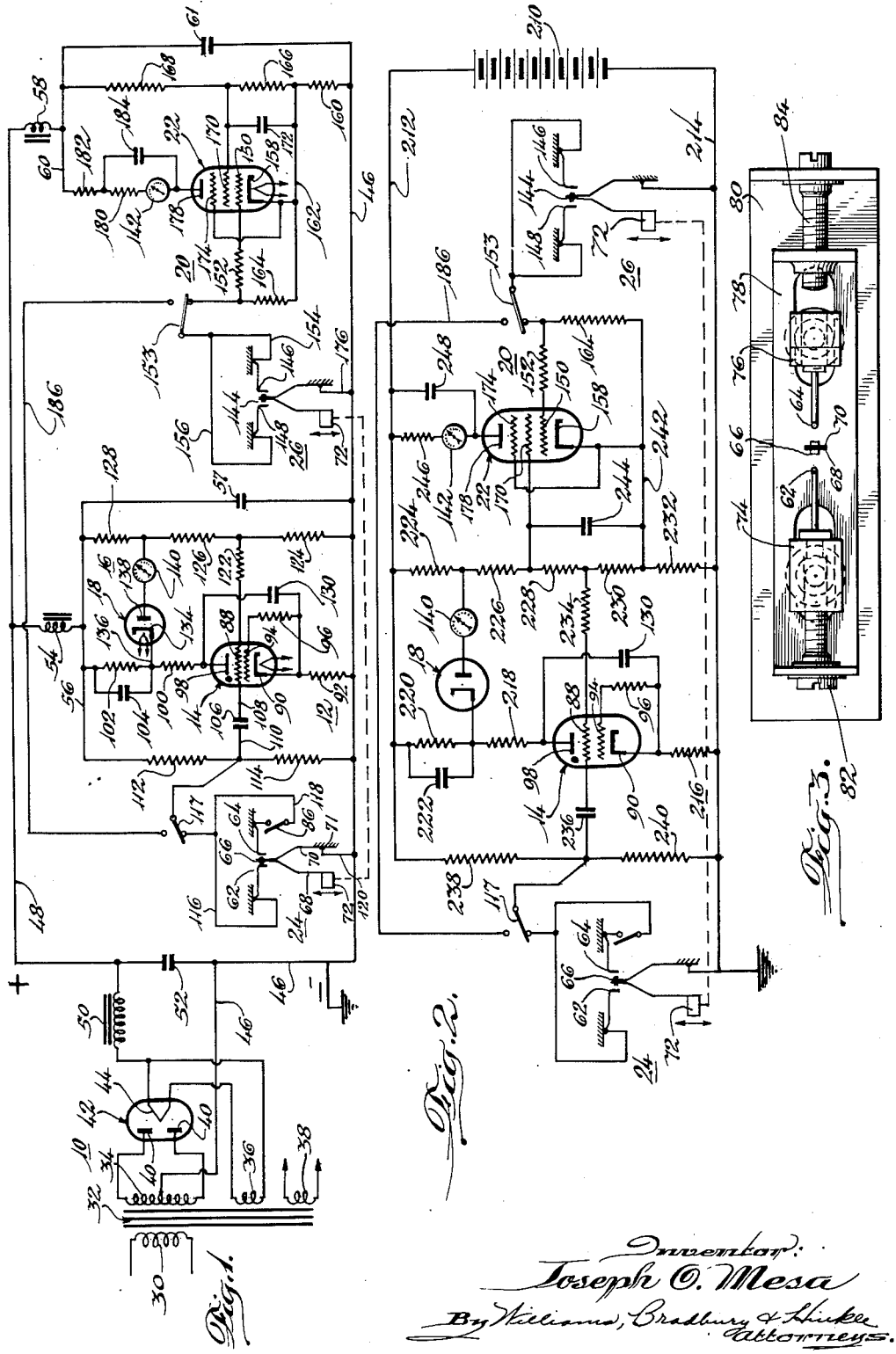

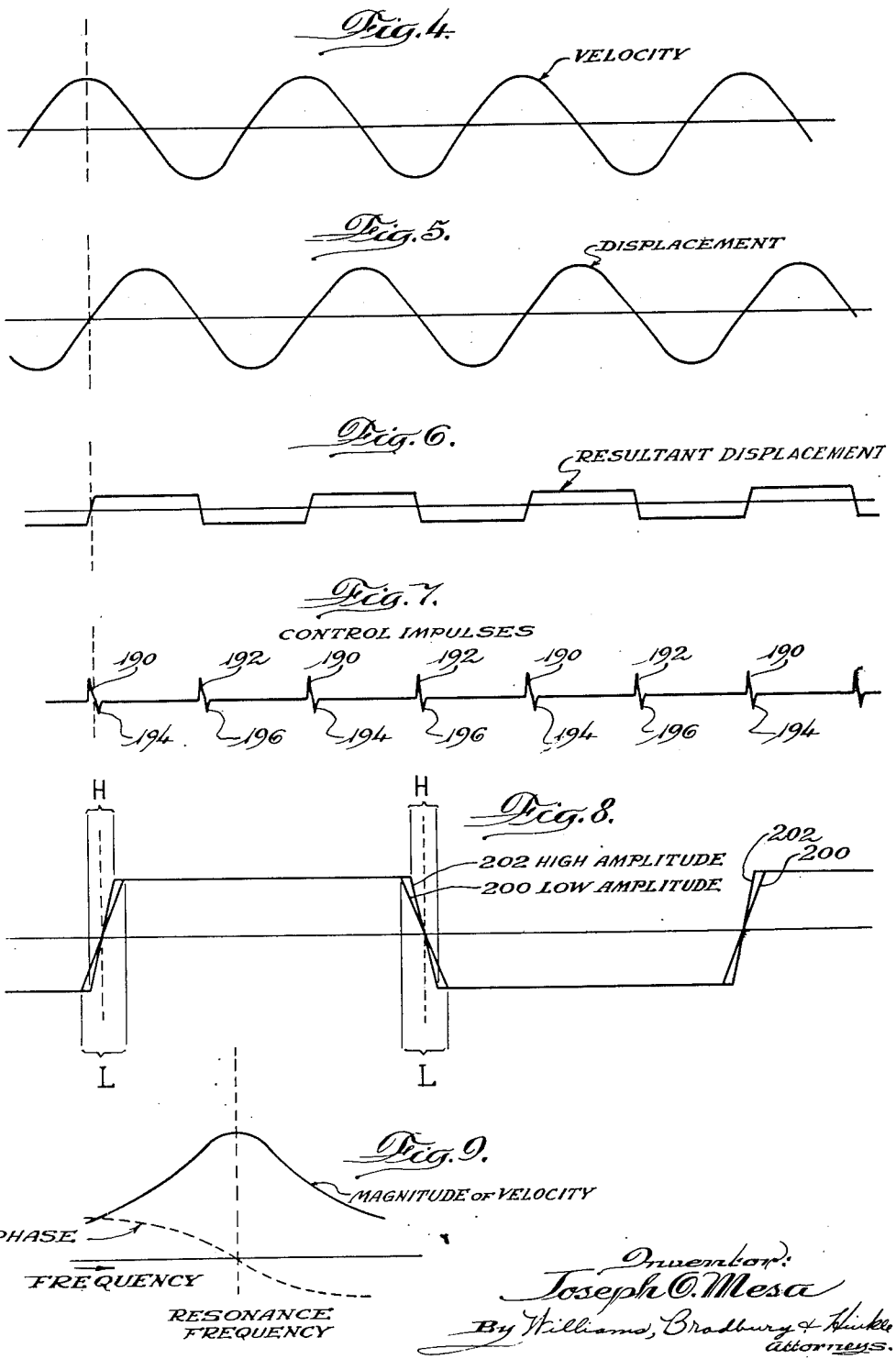

2,616,288

UNITED STATES PATENT OFFICE 2,616,288

ELECTRICAL APPARATUS FOR DETECTING UNBALANCE IN ROTATING BODIES

Joseph O. Mesa, Winnetka, Ill., assignor to Stewart-Warner Corporation, Chicago, Ill., a corporation of Virginia Application January 4, 1945, Serial No. 571,307

14 Claims. (Cl. 73—66)

The present invention relates to balancing and more particularly to a new and improved method of and apparatus for checking the balance of and for balancing rotating bodies.

In the past many different methods of and apparatus for balancing have been developed and used with varying degrees of success. In one known arrangement the locus of unbalance is determined at the resonance frequency of the system. The system may comprise, for example, an elastic damped vibrational system like a freely rotating automobile or airplane wheel which is preferably brought up to a speed above the resonant speed and then allowed freely to decelerate to the resonant speed at which a check of the unbalance is made. It is known that at the resonant frequency the amplitude of the resulting vibrations or displacement is a maximum as is the velocity of the vibration or displacement. It is known further that at this speed the velocity is in phase with the force of unbalance, i. e., with the locus of unbalance, and that the displacement lags the velocity by 90 degrees.

The best of the prior art balancing systems include circuits and the like for flashing a stroboscopic light source, such as a gaseous discharge tube, in synchronism with the vibrations and correlating the flashing with the rotating body to determine the locus of the unbalance. In certain of the prior art arrangements, the tube is flashed at the moment the velocity of the vibration or displacement is the greatest. This is accomplished by velocity responsive means (which may be a voltage generator, such as a pick-up coil) actuated by the vibrational displacement of the rotating system either in a radial or axial direction, depending upon whether the static and dynamic balance is to be checked. If the voltage generator is arranged to be responsive to vertical upward displacement of the rotating body and the light flashes occur at the time when the vibration velocity is at its instantaneous maximum value, the rotating body will appear stationary in the position at which the force is a maximum upward. If then the wheel is brought to rest with the wheel in its apparent stationary position, the locus of unbalance will be at the top and a weight can be added to the rotating body at the bottom to oppose and to neutralize the force of unbalance.

In the velocity responsive arrangements of the prior art, trouble has been encountered in correlating the flashing or firing of the stroboscopic light source with the locus of unbalance, i. e., with phasing, under widely varying conditions of amplitude and resonant velocity. In some arrangements trouble occurs at higher angular or resonant velocities, whereas in other arrangements the difficulty appears at low amplitudes. Just what causes the trouble is not known, but it may result from the intricacy of the integrating, amplifying, limiting and differentiating operations which are performed by the balancing apparatus.

The primary object of the present invention is to provide a new and improved method of and apparatus for balancing rotating bodies.

Another object of the present invention is to provide a new and improved method of and apparatus for balancing rotating bodies which is simple to practice, in construction, and which provides the proper phase of firing or flashing of the light source under widely varying conditions of amplitude and resonant velocity of the rotating body.

Another object of the present invention is to provide a new and improved method of balancing rotating bodies which comprises the step of flashing the light source in response to displacement and when the vibrational displacement is substantially zero.

Another object of the present invention is to provide new and improved balancing apparatus which includes a light source and displacement responsive means for flashing the light source, and, more specifically, flashing the light source at substantially the moment the vibrational displacement is zero and, preferably, taking place in a particular direction.

Another object of the present invention is to provide a new and improved balancing apparatus which includes a minimum of electrical means and which includes, on the other hand, mechanical means for amplifying the vibration and for producing flashing impulses at substantially the time the vibrational displacement is zero.

Another object of the present invention is to provide a new and improved balancing apparatus including mechanical means for amplifying the vibrational displacement and for producing electrical control impulses at the moment the displacement is substantially zero.

Another object of the present invention is to provide a new and improved simplified balancing apparatus insuring proper phase of firing of the light source under varying conditions of amplitude and resonant velocity, as well as providing amplitude and frequency measurements whereby the balancing operation may be made more effectively and satisfactorily.

A more specific object of the present invention is to provide new and improved balancing apparatus of the character aforesaid which includes but three electron tubes, namely, a gaseous discharge device which is fired synchronously with the zero displacement of the vibrating system, a second tube utilized for indicating the frequency of the vibrations, and a third tube for providing an indication of the amplitude.

Other objects and advantages of the present invention will become apparent from the ensuing description, in the course of which reference is had to the accompanying drawings, in which:

Fig. 1 is a diagrammatic representation of an embodiment of the present invention adapted to be supplied with power from an alternating current source;

Fig. 2 is a similar representation of another embodiment of the present invention adapted to be energized from a direct current source;

Fig. 3 is a view illustrating the adjustable mounting of a pair of electrical contacts forming part of the mechanical impulse producing means employed in the arrangements of Figs. 1 and 2;

Fig. 4 is a graph illustrating the nature of the vibrational velocity of a rotating body;

Fig. 5 is a graph illustrating the vibrational displacement of the body;

Fig. 6 is a graph illustrating, on a reduced scale, a resultant modified vibrational displacement from which it may be noted that the wave shape is modified by limiting the amplitude and that a substantial velocity occurs only substantially at the point of zero displacement of the rotating body;

Fig. 7 is a graph illustrating the nature of the control impulses produced as a result of the displacement of the character depicted in Fig. 6;

Fig. 8 is a graph which will be referred to in the description of the measurement of amplitudes of vibrations, the curve illustrating vibrations of two somewhat different amplitudes; and Fig. 9 is a graph showing how the magnitude and phase angle of the vibrational velocity vary with frequency.

The embodiment of the invention illustrated in Fig. 1 will first be described. It may be mentioned that the primary distinction between it and the embodiment of Fig. 2 resides in the fact that the apparatus of the former is energized from an alternating current source and that of the latter from a direct current source.

The apparatus of Fig. 1 includes, in the main, a power pack 10 for supplying direct current from an alternating current source; means indicated generally by the reference character 12 including a tube 14 for producing periodic light flashes (hereinafter called, for convenience, a flasher circuit); means indicated generally by reference character 16 including a second tube 18 for indicating the frequency of the vibrations and, therefore, the rotational frequency of the rotating apparatus being balanced (hereinafter called a frequency circuit); and means indicated generally by reference character 20 including a third tube 22 for providing an indication of the amplitude of the vibrations (hereinafter called the amplitude circuit).

The various tubes are controlled, in accordance with one of the primary features of the present invention, by mechanical vibration amplifying and impulse producing means of which two are preferably employed, as indicated generally by the reference characters 24 and 26, both of which are simultaneously operated in response to the displacement of the rotating body.

The power pack 10 is supplied with alternating current from a suitable source (not shown) to which the primary winding 30 of a transformer 32 may be connected. The transformer includes three secondary windings 34, 36 and 38, the first of which supplies anode potential to the anodes 40 of a rectifier tube 42 (which may be of the 5W4G tube), the second of which supplies heater current to the filamentary type cathode 44 of the tube, and the third of which supplies cathode heater current to tubes 14, 18 and 22. The midpoint of secondary winding 34 is connected to ground conductor 46 which thus forms the negative direct current power line while the positive direct current power line 48 is connected to the cathode 44 through a filter of known type which may include a choke coil 50 and a condenser 52 (having a value of about 20 microfarads). The choke coil is in series with line 48 and the condenser is connected across the positive and negative power supply lines.

The flasher and frequency circuits 12 and 16 are connected to the positive power supply line 48 through a filter coil 54 connecting the line to a branch supply line 56. A filter condenser 57 is connected across conductors 56 and 46. In similar manner the amplitude circuit 20 is connected to the positive supply line through a filter coil 58 connecting the supply line to a branch supply line 60, and a filter condenser 61 is connected across conductors 60 and 46. The described power supply circuit arrangement decreases the possibility of interference between the circuits.

The flasher and frequency circuits are controlled in response to the vibrational displacement of the rotating body. More specifically, the circuits are supplied with control impulses in response to vibrational displacement and at a time when this displacement is substantially zero. These impulses are arranged to flash or fire tube 14 when the vibrational displacement is substantially zero, and tube 14 is thus used as a stroboscopic light source. It is also used to control the frequency circuit. Te tube 14 may be fired either upon or the closure or opening of a mechanical switch, but it is preferred, and the arrangement has been illustrated as being of a type wherein firing occurs when contacts are opened.

The means 24 responsive to displacement, which of itself forms another feature of the invention, constitutes also movement amplifying and amplitude limiting means. It includes a pair of stationary contacts 62 and 64 illustrated diagrammatically in Fig. 1 and in greater detail in Fig. 3. The contacts are made of very flexible wires and preferably made of Phosphor bronze wire. The means includes also a movable contact 66 secured to the united ends of a pair of resilient and relatively long spring arms 68 and 70. The spring arms may be constituted of Phosphor bronze reeds having a thickness of about five thousandths inch. The contact 66 may have a thickness of about one-eighth inch and the spacing between it and the stationary contacts should be about a few thousandths (about three thousandths inch) on each side when it is centered. The arm 70 is secured to a fixed support such as that illustrated diagrammatically by reference character 71 and the united contact carrying ends 66 are disposed substantially between the contacts 62 and 64.

The movable contact 66 is vibrated between the limits defined by the two substantially stationary contacts 62 and 64 in response to vibrations of the rotating body, which, for convenience, will hereinafter be considered to be an automobile wheel. In checking the unbalance, the wheel is preferably suspended above ground for free rotation by some suitable device. The vibrations of the wheel (which may be the radial or axial vibrations, depending upon whether the wheel is to be balanced statically or dynamically) are transmitted to the arms 68 and 70 and thus to the movable contact 66. Assuming that the wheel is to be balanced statically, then the radial movements of the wheel support, preferably the vertical radial movements, are utilized to move the movable contact 66. These movements are transmitted to the contact through the reeds 68 and 70, which are connected to the wheel support (the axle, usually) by a small permanent magnet 72 secured to the free end of reed 68. As the wheel and its support move vertically, the magnet 72 is moved vertically to oscillate contact 66 a limited distance between the stationary contacts 62 and 64. The wheel support vibrates through a considerably greater distance than that between contacts 62 and 64 although the displacement is amplified because of the length of the reeds. Thus the movable contact quickly moves between contacts, and impulses are produced whenever the movable contact opens a circuit controlled thereby. The resonance frequency of the switch assembly should be high as compared with the working range of frequencies, i. e., the frequencies ordinarily encountered in systems of the character being balanced. The generally Gothic-like arrangement of the reeds 68 and 70 has been found to contribute to the satisfactory operation of the arrangement, although other arrangements may be used.

In order to insure firing of the tube 14 at substantially zero displacement, the movable contact 66 has to be centered with respect to contacts 62 and 64. This is accomplished by some suitable adjustable contact supporting means, such as that illustrated in Fig. 3. Referring to this figure, it will be seen that the two stationary contacts 62 and 64 are mounted upon supporting blocks 74 and 76, respectively, and that these are mounted upon a plate 78 slidably secured to a main supporting plate 80. The contact supporting block 74 is individually adjustably mounted on sliding plate 78 to vary the spacing between the stationary contacts. The adjustment is effected by suitable means, such as a rotatable adjusting screw 82.

The two contacts are movable simultaneously by movement of the sliding plate 78 as by an adjusting screw 84. Thus when the screw 84 is rotated, the two contacts are moved simultaneously so that the movable contact may be centered relative to them. The manner in which the centering is effected in checking the unbalance will be hereinafter described in greater detail.

It may be well to mention at this point that while the described switch assembly includes two stationary contacts which are alternately engaged by the movable contact, only one of these contacts (contact 62) is used during the balancing operation. The other contact 64 is utilized in centering the movable contact and it is arranged to be cut out from the flasher circuit during the balancing operation by means of a manually operable switch 86.

The tube 14 is fired each time the movable contact moves out of engagement with a stationary contact. When the switch 86 is closed, the tube is fired twice per cycle and, to center the movable contact, the stationary contacts are moved relative to the movable contact by means of screw 84 until the tube fires so that the apparent positions of the wheel are 180 degrees apart. When thus adjusted, the movable contact is properly centered relative to the stationary contacts.

The tube 14 is preferably fired by the application of a positive voltage impulse to the control grid 88 of the tube. The tube may be of the 631P1 type. The cathode 90 of the tube is connected to the negative supply line 46 through a cathode bias resistor 92 (of about 2000 ohms). The shield grid 94 is connected to the cathode through a resistor 96 (of about .1 megohm). The anode 98 of the tube is connected to the branch supply line 56 through the series connected resistors 100 (of about 6000 ohms) and 102 (of about 4000 ohms), of which the latter and its associated shunt condenser 104 (of about 1000 mf.) form an essential part of the frequency circuit 16.

The tube 14 is coupled to the switch assembly through a coupling condenser 106 (of about .08 mf.), one plate of which is connected to grid 88 by conductor 108, and the other of which is connected by conductor 110 to the junction of a pair of potential dividing resistors 112 and 114 (each of about .5 megohm) connected in series across conductors 56 and 46. The junction of the two resistors is connected to contacts 62 and 64 through conductor 116 (having a normally closed amplitude centering control switch 117 interposed therein) and through conductor 118 and switch 86, respectively. When the movable contact engages either of the fixed contacts, the resistor 114 is shorted and the plate of condenser 106 remote from grid 88 is connected to ground through reed 70 and ground connection 120.

The grid of tube 14 is rendered more positive and the tube fires whenever the movable contact 66 moves out of engagement with a stationary contact. When in engagement with a stationary contact, the condenser 106 is charged to a relatively low potential through resistor 122 (of about 1 megohm) connecting the grid to the junction of resistors 124 and 126 (of about 8000 ohms and 20,000 ohms, respectively) forming a potential divider connected across conductor 56 and ground conductor 46 through a third resistor 128 (of about 400 ohms). It may be noted, therefore, that when the movable contact is in engagement, say with contact 62, one plate of condenser 106 is connected to ground and the other to the junction of the potential dividing resistors 124 and 126. When the movable contact is disengaged from the stationary contact, a positive voltage impulse is applied to the grid 88 of tube 14 through the coupling condenser 106, the normally grounded end of which is substantially raised to a much higher potential by breaking of the ground connection and leaving it effectively connected across the voltage dividing resistor 114.

When the tube 14 is rendered conductive, a current impulse is caused to flow through it to lower the anode voltage below the ionization potential and to bias its grid negatively thereby to render the tube nonconductive. The current impulse is supplied by a condenser 130 (of about 2 mf.) which is normally charged and which is connected directly across the anode and cathode of the tube. The condenser discharge through the tube lowers the anode-cathode voltage and applies a negative bias to the grid because of the increased voltage drop across the cathode biasing resistor 92.

During the time that the movable contact is between the two stationary contacts, the condenser 106 is charged to a new and relatively low potential dependent upon the voltages at the junctions of resistors 112 and 114 and resistors 124 and 126. When the movable contact 66 engages the other stationary contact, resistor 114 is again short-circuited. This suddenly lowers the potential of the ground end of condenser 106 and results in the application of a voltage impulse on grid 88. This impulse, however, is of such polarity and magnitude (it is negative and roughly about half of the other impulse) as not to effect firing of the stroboscopic tube. Thereafter, the condenser 106 is again recharged to its original potential.

The vibration frequency is obtained by measuring the average value of the current flow through the tube 18 (which may be a diode of the 6X5 type) which is dependent upon the frequency with which tube 14 is fired. Cathode 134 of tube 18 is connected by conductor 136 to the junction of resistors 100 and 102. Its anode 138 is connected to the junction of resistors 126 and 128 through a meter 140 which may be a sensitive ammeter. The voltage of the anode of the diode is very nearly that of line 56 while the cathode voltage is dependent on the voltage drop across resistor 102 and the average charge of condenser 104 which is connected parallel to resistor 102. The flow of current through resistor 102 is dependent upon the frequency of the firing of the tube 14 with the result that the meter 140 provides a reading proportional to the frequency. Each time the tube 14 flashes the condenser 130 first discharges through the tube and is then charged through the series connected resistors 100 and 102. The charging current causes a voltage drop across resistor 102 which is utilized to charge condenser 104. The potential of the cathode 134 of diode 18 falls below that of its anode and current thus flows through the diode and meter 140. The time constant of the frequency circuit is chosen to be relatively long so that the average potential of the diode cathode and the average value of the diode current depend upon the interval between flashes of tube 14. The meter reading, therefore, is a function of the flashing frequency and is independent of the amplitude of the vibrations.

The amplitude circuit 20 is so constructed and arranged that a meter 142 in circuit with tube 22 provides a reading of the amplitude which is independent of the vibration frequency. The arrangement is such that the tube 22 is periodically rendered conductive in synchronism with the vibrations and preferably twice for each revolution of the wheel. Each time it is rendered conductive, a current impulse flows through the tube and meter. The current impulse has a value dependent upon the amplitude. In the instant embodiment, the current impulse varies inversely with the velocity of the vibration, which, it will be shown shortly, varies proportionately with the amplitude of the vibration so that the meter thus provides an indication of the amplitude of the vibrations.

The tube 22 is a pentode (preferably of the 6SJ7 type) having a substantially constant current flow characteristic. The tube is biased to cut-off when the movable contact 144 is in engagement with either of the stationary contacts 146 and 148 of the control means 26, which is identical with device 24, except that it has no manually operable switch for cutting out one of the contacts, and which is operatively connected to the wheel support by the same magnet 72 referred to in the description of device 24. When the movable contact 144 is between the stationary contacts, the tube 22 is rendered conductive for a length of time depending on the time it takes for the movable contact to move between the two stationary contacts.

The control means 26 is coupled to the control grid 150 of tube 22 through resistor 152 (of about .1 megohm), a normally closed centering switch 153, and branch conductors 154 and 156 leading to the stationary contacts. The cathode 158 of the tube is connected to a bias resistor 160 (of about 1000 ohms) through a conductor 162. A grid leak resistor 164 (of about .1 megohm) is connected across the cathode and the contactor end of resistor 152.

The cathode bias resistor 160 is connected across the positive branch supply conductor 60 and ground conductor 46 through the series connected voltage dividing resistors 166 and 168 (of about 7500 and 10,000 ohms, respectively). The screen grids 170 of tube 22 is connected to the junction of resistors 166 and 168, of which the former is shunted by a by-pass condenser 172 (of about 20 mf.). The suppressor grid 174 is connected to the cathode 158.

The switch assembly controls the bias voltage applied to grid 150. When open, the grid bias is reduced to zero and when closed the grid is biased negatively to cut-off by the voltage drop across resistor 160, the grid being connected to the ground end of the resistor by conductor 46, conductor 176, the switch assembly and resistor 152.

The amplitude meter 142 is connected between the plate 178 of tube 22 and conductor 60 through resistors 180 and 182 (of about .2 megohm and 1500 ohms, respectively). To reduce the pulsations of the meter, a condenser 184 (of about 4 mf.) is connected across the series connected meter and resistor 180.

The switch assembly of control means 26 is preferably centered by connecting it to the flasher circuit 12 so that the centering may be effected in the same manner as the centering of control means 24. When it is desired to center the control means 26 the previously referred to switches 117 and 153 are operated, preferably simultaneously, so that the stationary contacts 146 and 148 are coupled to flasher tube 14 through a circuit including the previously referred to switches 117 and 153 and conductor 186. If desired, the switches 117 and 153 may be mechanically interconnected for simultaneous operation.

Before proceeding with a description of the operation of the device in connection with the checking and balancing of a rotating body such as an automobile wheel, it is deemed best to consider briefly Figs. 4 to 9, inclusive, in order that a more comprehensive understanding may be had of the principles underlying the present invention.

Fig. 4 depicts graphically the vibrational velocity of the rotating body. From this it may be noted that the velocity varies sinusoidally, and from Fig. 9 it may be noted that when the system is rotating at resonant frequency, the velocity is a maximum and the phase angle between the velocity and force on one hand and locus of balance on the other is zero.

The vibrational displacement is depicted in Fig.

5 and from this it may be noted that it is equivalent to the time integral of the curve of Fig. 4.

Fig. 6 depicts the displacement of the movable contact 66 which is mounted at the ends of the reeds 68 and 70 and which is moved in synchronism with the vibrations of the rotating body. The vibrations are amplified by the mechanical amplifier constituted by the lever arm of the reeds, and the amplified vibrations are limited by the stationary contacts 62 and 64. When the movable contact is properly centered, the movable contact moves quickly with an increased velocity from one to the other of the stationary contacts at the time of zero displacement or at the time the velocity is a maximum.

Fig. 7 depicts the nature of the control impulses applied to the grid of tube 14. The higher amplitude positive impulses occurring upon disengagement of the movable contact 66 from contact 62 are depicted by reference characters 190 and those occurring when the movable contact is disengaged from contact 64 are indicated by reference characters 192. Similarly, the two groups of negative impulses occurring upon engagement with contacts 64 and 62 are shown by reference characters 194 and 196, respectively.

It should be noted that even though contacts 62 and 64, which are made of very flexible wires, may move somewhat because of the engagement by the movable contact, this has no effect, electrically speaking, because it is the time of engagement which is controlling and provides the limiting function.

Fig. 8, which depicts vibrations of two different amplitudes, is used to illustrate how the time tube 22 of the amplitude circuit remains conductive, and the current flow through it, varies inversely with the amplitude of the vibrations. The amplitudes or magnitudes of the vibrations are also directly proportional to the velocities so that the time taken by the movable contact in traveling from one stationary contact to the other, which is inversely proportional to the velocity, is also inversely proportional to the amplitude. Fig. 8 illustrates low and high amplitude vibrations, which are indicated by reference characters 200 and 202, respectively. In the graph the ordinates represent amplitude of vibrations and the abscissae represent time. The time required by the movable contact to move from one stationary contact to the other for a low amplitude vibration is indicated by the reference character L. The time for the movable contact to move between the two stationary contacts for a high amplitude vibration is indicated by the reference character H. Inasmuch as the tube 22 is conductive during the time the movable contact is moving between the stationary contacts, it may be noted from Fig. 8 that the tube is conductive for times varying inversely with the amplitude, i. e., the tube is conductive for a longer period of time for low than it is for high amplitude vibrations. The tube 22 has constant current flow characteristics so that the current flow through it also varies inversely with the amplitude.

The operation of the present invention may be perhaps best reviewed in connection with the balancing of an automobile wheel. The wheel is first provided with a distinctive mark, such as a chalk mark on the tire, which may be readily observed when the rotating wheel is illuminated by the stroboscopic tube. The control means actuating means is secured to the wheel support, for example, to the axle, by attachment of the permanent magnet thereto in such manner that the magnet moves vertically as indicated by the arrow alongside it. It should perhaps be observed at this point that the control means 24 and 26 may be built as a single unit which may readily be connected electrically to the remainder of the apparatus including the flasher, frequency, and amplitude circuits, which may be, if desired, constructed as a separate unit and housed within a suitable cabinet or the like.

The wheel is rotated at about the resonant speed and the movable contact 66 centered with switch 86 closed and switch 117 in its indicated position. The centering is effected by adjustment screw 84 which simultaneously moves the stationary contacts 62 and 64 relative to the movable contact 66. The adjustment is properly made when the stroboscopic tube 14 flashes when the chalk mark on the wheel appears at two positions which are 180 degrees apart.

The movable contact 144 is similarly adjusted after it has been connected to the flasher circuit by means of switches 117 and 153 which are operated, preferably simultaneously, to their displaced positions whereby control means 26 is connected to the input of flasher tube 14 through conductor 186. The stationary contacts are then adjusted until the chalk mark appears at two positions 180 degrees apart. The switches 117 and 153 are then returned to their indicated positions and the apparatus is ready to check the balance of the wheel.

The movable contact 144 may also be centered without connection to the flasher circuit. This is accomplished by observation of the amplitude meter 142 which reads a minimum when the contacts are centered. The minimum reading results from the fact that when the contact is centered, its velocity is the greatest and it moves between the stationary contacts in the shortest time. As a result, the tube 22 is conductive for a minimum length of time and the meter reading, therefore, is a minimum.

In checking the balance of the wheel, the wheel is first brought to a speed above its resonant speed and then decelerated freely to its resonant speed. The resonant speed is indicated by the reading of frequency meter 140. The amplitude meter 142 registers a maximum at resonant speed and thus indicates when resonance has been reached. The switch 86 is opened so that tube 14 flashes once for each revolution of the wheel, i. e., when the movable contact 66 moves out of engagement with contact 62 which it does when the vibration is vertically upward indicating that the locus of unbalance is at the top at the moment the tube is flashed. The position of the chalk mark, i. e., its apparent stationary angular position, is noted. The wheel is then brought to rest with the chalk mark at the noted apparent position. When the wheel is thus positioned, the locus of unbalance is at the top and the wheel may be balanced by adding a weight at the bottom. The weight to be added can be determined from the reading of amplitude meter 142. Thereafter, the wheel may be brought up to its resonant speed, as previously noted on meter 140 and the balance again checked.

The embodiment of the invention illustrated in Fig. 2 is very much like that already described. The primary distinction between the two is that the embodiment of Fig. 2 utilizes a battery 210 as the source of energy. This battery may supply a relatively high voltage as of about 300 volts across positive and negative power supply lines 212 and 214.

The flasher and amplifier tubes 14 and 22 are connected across the power supply lines through resistance means. The cathode 90 of tube 14 is connected to the negative line through a cathode bias resistor 216 (of about 2000 ohms). The anode 98 is connected to the positive power supply line 212 through the series connected resistors 218 and 220 (of about 6000 and 4000 ohms, respectively). The latter is shunted by condenser 222 (of about 1000 mf.).

A common potential divider is utilized for all three tubes 14, 18 and 22. It includes the resistors 224, 226, 228, 230 and 232 (of about 500 ohms, 1.5 megohms, 1200 ohms, 4700 ohms and 1500 ohms, respectively). The tube 18 and frequency meter 140 are connected in series across the junctions of resistors 218 and 220 and of 224 and 226. The control grid 88 of flasher tube 14 is connected to the junction of resistors 228 and 230 by a series resistor 234 (of about one tenth megohm). The condenser 130 is connected across the cathode and anode of the tube and the shield grid 94 is connected to the cathode through the resistor 96.

The flasher tube grid 88 is coupled to the control means 24 through a condenser 236 (of about .005 mf.) which is connected directly across the grid and the junction of the potential dividing resistors 238 and 240 (of about one tenth megohm and five tenths megohm, respectively). This junction is also connected to the switch 117 as is the case with the embodiment of the invention illustrated in Fig. 1.

The amplitude circuit tube 22 has its screen grid 170 connected to the junction of resistors 226 and 228. Its cathode 158 is connected by conductor 242 to the junction of resistors 230 and 232, the latter of which acts as a cathode bias resistor for the tube. A by-pass condenser 244 (of about 20 mf.) is connected across conductor 242 and the screen grid 170. The suppressor grid 174 is connected to the cathode.

The amplitude meter 142 is connected in series with resistor 246 (of about .2 megohm) across the anode 178 of tube 22 and the positive line 212. The meter and resistor are shunted by a condenser 248 (of about .4 mf.).

The control grid 150 of the amplitude tube is coupled to the control means 26 through the resistors 152 and 164 corresponding to the similarly numbered resistors of Fig. 1.

From the foregoing detailed description of the embodiment of Fig. 2 it is apparent that the circuit is substantially like that of Fig. 1 and it is therefore deemed unnecessary to describe its operation in any detail as it corresponds to that already described.

The apparatus of the present invention is relatively simple compared with other devices in the art, and it provides frequency and amplitude readings and indicates the locus of unbalance so that the wheel may be balanced with a minimum of trouble. Furthermore, the arrangement is such that it can be readily applied to various types of devices and to different wheels of an automobile with a minimum expenditure of time and effort. It operates satisfactorily over a wide range of amplitudes and frequencies and is, therefore, capable of widespread use.

While two embodiments of the present invention have been described, it should be understood that the details thereof are not intended to be limitative of the invention except insofar as set forth in the accompanying claims.

Having thus described my invention, what I desire to secure by United States Letters Patent is:

1. Balancing apparatus of the type including a gaseous discharge device having a cathode, and anode, and a control grid, including in combination, means including a cathode resistor for connecting the anode-cathode circuit to a source of power, means including a potential divider connected with a potential source and a resistor connecting the divider to said grid for applying a voltage to the grid, means including a second potential divider connected with a source of potential, a condenser connecting the grid to the second potential divider and circuit controlling means coupled to said condenser and said second mentioned potential divider controlling the effectiveness of a portion of said voltage divider for producing control impulses transmitted to the grid through said condenser for controlling the conductivity of said device, and means connected to said circuit controlling means and adapted to be connected to a body to be tested for unbalance.

2. Balancing apparatus of the type including a gaseous discharge device having a cathode, an anode, and a control grid, including in combination, means including a cathode resistor for connecting the anode-cathode circuit to a potential source, means including a potential divider connected across the potential source and a resistor connecting an intermediate portion of the divider to said grid for applying a voltage to the grid, and means including a second potential divider connected across the potential source, a condenser connecting the grid to an intermediate portion of the second potential divider for supplying control impulses to the grid, and mechanical switch means operated alternately to short circuit the portion of the second voltage divider between said condenser and the negative side of the potential source for producing control impulses transmitted to the grid through said condenser for controlling the conductivity of said device, and means connected to said switch means and adapted mechanically to be connected to a body to be tested for unbalance.

3. Balancing apparatus of the type including a gaseous discharge device having a cathode, an anode, and a control grid, including in combination, means including a cathode resistor for connecting the anode-cathode circuit to a source of power, means including a potential divider coupled with a potential source and a resistor connecting the divider to said grid for applying a voltage to the grid, means including a second potential divider connected with a source of potential and a condenser connecting the grid to the second potential divider for supplying control impulses to the grid, means including circuit controlling means coupled to said second mentioned potential divider for controlling the effectiveness of a portion of said voltage divider for producing control impulses transmitted to the grid through said condenser for controlling the conductivity of said device, a second condenser connected across said discharge device, a resistor connected between the anode and the positive side of said potential source, a third condenser parallel to the last mentioned resistor, and means including a rectifier and a meter also connected across said last mentioned resistor for measuring the average voltage across said third condenser, and means connected to said circuit controlling means and adapted to be connected to a body to be tested for unbalance.

4. Control mechanism for balancing apparatus, including in combination, a pair of flexible contacts spaced apart a short distance, a movable contact, and resilient means for supporting said movable contact for movement between and into and out of engagement with the pair of contacts, said last mentioned means including a first resilient reed having the end opposite the contact carrying end secured to a stationary support, a second resilient reed adjacent said first mentioned reed having a permanent magnet secured at its free end, said reeds defining a configuration corresponding generally to a Gothic arch with the movable contact located at its apex.

5. In a balancing apparatus for detecting the unbalance of a rotating body carried by a support yieldably mounted upon a base to permit vibrations of the body and the support having a substantial amplitude, a control mechanism comprising first and second contacts, means securing the contacts to the base with a space between the two contacts, a third movable contact, an operating member adapted to be rigidly connected with the support and thus to vibrate with the support, yieldable means securing the movable contact to the operating member and positioning the movable contact to occupy a central portion of the space between said first and second contacts, the remainder of the space being much shorter than the amplitude of the vibrations of the support, whereby the movable contact is movable between the first and second contacts in a brief time interval substantially when the displacement of the vibrating support is zero.

6. Apparatus for balancing a body, comprising a stroboscope including an electron tube having a grid; a source of grid potential; and control means for varying the potential of the grid to flash the stroboscope, said control means including a pair of stationary contacts, a movable contact operable into and out of engagement with said stationary contacts, said movable contact being electrically coupled with the source and adapted to be mechanically coupled with the body, means coupling one of the stationary contacts to the grid, and manually operable switch means for selectively coupling and uncoupling the other of said stationary contacts to said grid, whereby said stroboscope may be flashed once or twice for each cyclic movement of the body as desired.

7. Apparatus for balancing a vibrating body, comprising a pair of electron tubes having respective grids, one of said tubes being a stroboscopic tube; and control means for varying the potentials of the grids, said control means including two pairs of adjustably mounted contacts, two movable contacts respectively operable into and out of engagement with said adjustably mounted contacts, common means adapted mechanically to connect the movable contacts with the body to operate the movable contacts in synchronism with vibrations of the body, a first manually operable switch selectively to couple one of said pairs of adjustably mounted contacts with either of said electron tubes, a second manually operable switch selectively to couple said one or the other of said pairs of adjustably mounted contacts with the stroboscopic tube, and circuit means to connect said switches in series when both said switches are moved to such position as to couple said one pair of adjustably mounted contacts to the stroboscopic tube, whereby either of said pairs of adjustably mounted contacts may be centered with respect to said movable contacts by means of the stroboscopic tube.

8. Apparatus for indicating the locus of unbalance of a body rotatably mounted upon a yieldable support and for indicating the amplitude of the vibrations of the body, comprising a stroboscopic tube, an amplitude indicator including a second tube, a frequency indicator including a third tube, means coupling said third tube with said stroboscopic tube, a pair of means operable to supply control impulses in response to vibrations, each of said means being adjustable to supply said impulses when the instantaneous vibrational displacement of said body is substantially zero, a single means adapted mechanically to connect said pair of control means with the support, a first manually operable switch adapted selectively to couple said stroboscopic tube with either of said control means, a second manually operable switch selectively to couple one of said control means with either said second tube or with the stroboscopic tube, and circuit means to connect said switches in series when both switches are moved to such position as to couple said one control means to the stroboscopic tube, whereby either of said control means may be adjusted to supply impulses when the instantaneous vibrational displacement of the support is substantially zero during an adjustment phase of operation of the apparatus and said stroboscopic tube and said second tube may be supplied with such impulses during a normal operating phase of operations.

9. In an apparatus for indicating the unbalance of a rotating body carried by a yieldable support, a control mechanism comprising a stationary member, a pair of flexible contacts secured to the stationary member and spaced apart a short distance, first and second substantially parallel elongated reeds, a movable contact secured to the outer end of said first and second reeds for movement in a plane substantially perpendicular to the reeds between and into and out of engagement with the pair of contacts, the inner end of the first reed being secured to the stationary member, actuating means adapted to be connected with the support for movement in response to vibrations of the support, the inner end of the second reed being connected with the said actuating means for longitudinal vibrational movement of the second reed, whereby the vibrations of the support are amplified and move the movable contact between the flexible contact and a stationary contact in a brief interval relative to the period of the vibration of the support.

10. Apparatus for indicating the unbalance of a rotating body, comprising a stroboscopic device, an actuating means adapted to be mechanically coupled with the body for movement in response to vibrations of the body, a stationary support, a switch including a pair of flexible contacts secured to the support and spaced apart a short distance, first and second substantially parallel flat elongated resilient members spaced apart a short distance, a movable contact secured to the outer end of said first and second members for movement substantially perpendicular to said members between and into and out of engagement with said flexible contacts, the inner end of the first member being connected with the stationary support and the inner end of the second member being connected with the actuating means for longitudinal vibrational displacement of the second member, and means electrically coupling the flexible contact and the movable contacts with the stroboscopic device for flashing the device upon operation of the switch.

11. An apparatus for measuring the frequency of electrical impulses, comprising a gaseous discharge device including a grid, an anode and a cathode; grid circuit means adapted to impress the impulses upon the grid to initiate conduction in the device periodically in unison with the impulses; a capacitor connected between the anode and the cathode to provide abrupt surges through the device; a potential source for charging the capacitor including means including a high voltage terminal to provide a relatively high voltage and means including a lower voltage terminal to provide a relatively lower voltage; means to connect the potential source to the device including first and second charging impedances connected in series between the high voltage terminal and the anode, the first charging impedance having first and second terminals, the first terminal being connected to the high voltage terminal; and means to measure the average charging current supplied by the potential source to the capacitor, including a current measuring instrument and a rectifier connected in series between the low voltage terminal and the second terminal of the first charging impedance, the rectifier being polarized to prevent current flow from the second terminal of the first charging impedance to the low voltage terminal.

12. Balancing apparatus for indicating the amplitude of the vibrations of a body, comprising a switch operating member adapted to be connected with the body for vibration in unison therewith through a stroke proportional to the amplitude of the vibrations of the body, an electrical switch connected with the member for operation when the member traverses a segment of its stroke, the segment being substantially fixed in length, the switch including means providing for substantial overtravel of the member outside the segment, the switch being closed during overtravel, vibrational amplitude indicating means including an indicator of the average value of an electric current, and electrical circuit means coupling the switch to the indicating means to supply current having a predetermined value to the indicator when the switch is open, the current supplied to the indicator being changed by a predetermined amount when the switch is closed.

13. Balancing apparatus for indicating the amplitude of the vibrations of a body throughout a predetermined range of vibrational displacement, comprising a switch including a pair of contacts spaced apart a predetermined amount, a third contact positioned between the pair of contacts, stationary means supporting said pair of contacts, a switch operating member connected to said third contact and adapted to be connected with the body and movable through a predetermined distance for moving the third contact relatively to shift the third contact between the contacts of the pair, the last mentioned distance being substantially less than the range of vibrational displacement of the body, means in the switch providing for substantial overtravel of the switch member beyond said predetermined distance, means electrically connecting the contacts of the pair together, circuit means connected between the contacts of the pair and the third contact to produce impulses in accordance with opening of the switch, and means coupled to the circuit for measuring the duration of the impulses in proportion to the interval beween their occurrences.

14. Balancing apparatus for indicating the amplitude of the vibrations of a body throughout a predetermined range of vibrational displacement, comprising a switch including a pair of contacts spaced apart a predetermined amount, a third contact positioned between the pair of contacts, stationary means supporting said pair of contacts, a switch operating member connected to said third contact and adapted to be connected with the body and movable through a predetermined distance for moving the third contact relatively to shift the third contact between the contacts of the pair, the last mentioned disance being substantially less than the range of vibrational displaceemnt of the body, means in the switch providing for substantial overtravel of the switch operating member beyond said predetermined distance, and means electrically connecting the contacts of the pair together; an electron tube having a grid, an anode and a cathode; a source of potential; a grid-cathode circuit including the source, the switch and the grid for connecting and disconnecting the source and the grid when the switch is closed and opened; and an anode-cathode circuit including an average anode current indicator for indicating the amplitude of the vibrations.

JOSEPH O. MESA.

REFERENCES CITED

The following references are of record in the file of this patent:

UNITED STATES PATENTS

| Number | Name | Date |
| --- | --- | --- |
| 1,328,320 | Crane | Jan. 20, 1920 |
| 1,704,341 | Rathbone | Mar. 5, 1929 |
| 1,891,493 | Apostoloff | Dec. 20, 1932 |
| 2,026,421 | Fecker | Dec. 31, 1935 |
| 2,043,618 | Havill | June 9, 1936 |
| 2,092,096 | Swedlund | Sept. 7, 1937 |
| 2,148,913 | Stevens | Feb. 28, 1939 |
| 2,171,303 | De Forest | Aug. 29, 1939 |
| 2,200,064 | James | May 7, 1940 |
| 2,204,425 | Mershon | June 11, 1940 |
| 2,232,959 | Miller | Feb. 25, 1941 |
| 2,328,114 | Weaver et al. | Aug. 31, 1943 |
| 2,331,771 | Germeshausen et al. | Oct. 12, 1943 |
| 2,344,349 | Forster | Mar. 14, 1944 |
| 2,349,530 | Weaver et al. | May 23, 1944 |
| 2,357,834 | Leifer | Sept. 12, 1944 |
| 2,363,316 | Hagg | Nov. 21, 1944 |
| 2,373,332 | O'Neill | Apr. 10, 1945 |
| 2,405,430 | Kent | Aug. 6, 1946 |
| 2,417,860 | Cline | Mar. 25, 1947 |
| 2,418,762 | Dehn | Apr. 8, 1947 |

FOREIGN PATENTS

| Number | Country | Date |
| --- | --- | --- |
| 695,243 | Germany | Aug. 21, 1940 |
| 473,636 | Great Britain | Oct. 18, 1937 |
| 117,371 | Australia | Aug. 19, 1943 |